United States Patent

Davidson

[15] 3,646,416
[45] Feb. 29, 1972

[54] SOLID-STATE CIRCUIT CONTROLLED THREE-PHASE REVERSING STARTER

[72] Inventor: Cecil W. Davidson, Dallas, Tex.
[73] Assignee: Forney Engineering Company, Dallas, Tex.
[22] Filed: Oct. 27, 1970
[21] Appl. No.: 84,281

[52] U.S. Cl. ..................................318/207 R, 318/227
[51] Int. Cl. ..................................................H02p 1/40
[58] Field of Search ..................318/206 R, 207 R, 227

[56] References Cited

UNITED STATES PATENTS

| | | |
|---|---|---|
| 3,253,202 | 5/1966 | Cotton..................................318/227 |
| 3,309,593 | 3/1967 | Egglestone et al.................318/227 X |
| 3,568,020 | 3/1971 | Lisi....................................318/207 R |

*Primary Examiner*—Gene Z. Rubinson
*Attorney*—John Maier, III, Marvin A. Naigur and John E. Wilson

[57] ABSTRACT

A protective solid-state logic circuit controlling the operation of an AC motor energized by a three-phase current supply in which two phases are reversed to reverse rotation of the motor, is provided with critical time delay components for causing electrical braking of the running motor by the provision a certain relatively short AC power reversal time for stopping the so running motor without creating damaging short circuiting in the system, each time the direction of rotation of the motor is reversed by switching the logic circuit.

2 Claims, 1 Drawing Figure

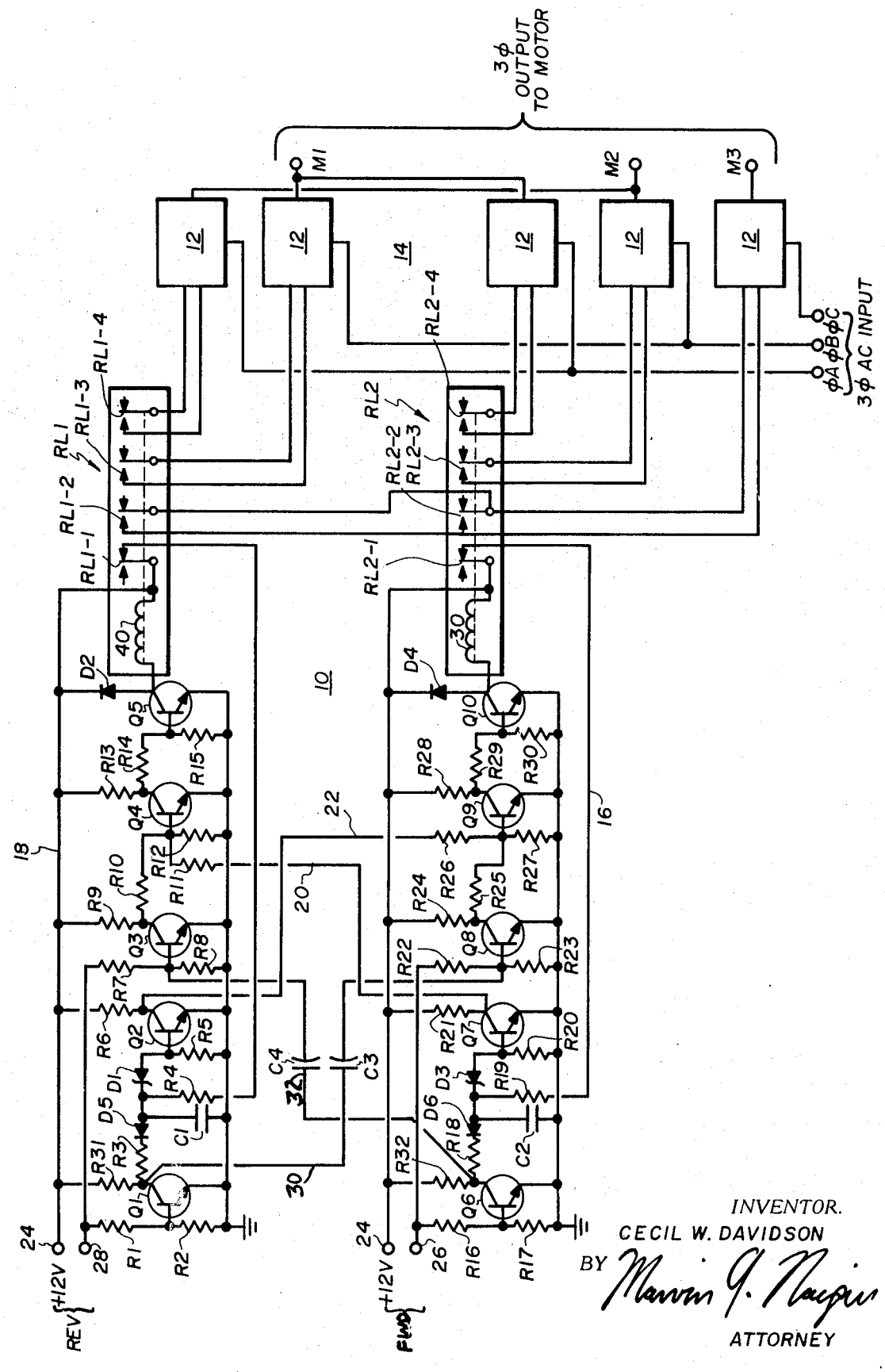

SOLID-STATE CIRCUIT CONTROLLED THREE-PHASE REVERSING STARTER

BACKGROUND OF THE INVENTION

This invention relates to solid-state logic circuits for controlling the operation of three-phase motors. The invention represents an improvement over the prior art as disclosed by the copending U.S. Pat. application of Edward L. Lisi, filed Nov. 14, 1968, Ser. No. 775,782, now U.S. Pat. No. 3,568,020, for Solid State Switch Protected Three Phase Motor Reversing Starter.

In the past electromechanical braking of a running AC motor has been required between reversals. Accordingly, elimination of such brakes is desirable, but attempts to do so have resulted in damage to the equipment.

An object of this invention is to provide a novel control circuit means for electrically braking a reversible three-phase motor while it is in operation, by automatically reversing two phases of the power supply circuit to the motor for a short critical period of time, when the motor is required to stop. Thus, by electrically braking the motor in this manner, the prior need for an electromechanical brake is eliminated.

For the sake of brevity the disclosure of the aforementioned application Ser. No. 775,782 is incorporated herein by reference. The control circuit of this prior application has been modified in accordance with the present invention by the incorporation of time delay RC circuit components in the transistorized network, which are selected to provide a precise motor reversal time immediately prior to each time the motor is stopped. Such components include cross-connected circuits comprising a capacitor in combination with the resistor and diode of the control circuit of the first transistor of each section, the values of which are critically proportioned to produce a selected motor AC power reversal time in milliseconds. Such cross-connected circuits are connected from the input terminal of the second transistor of each section to the control terminal of the first transistor of the other gate section.

SUMMARY OF THE INVENTION

In accordance with an illustrative embodiment demonstrating features and advantages of the present invention, there is provided a reversing starter for an AC motor adapted to be energized by a three-phase current supply system which includes a solid-state alternating current switching circuit operative in response to a directional command signal to control two of the phases of such system to cause rotation of the motor in the selected direction. A protective solid-state logic circuit is provided for controlling the switching circuit, which includes at least two logic gates one for controlling the passage of a forward command signal, and the other for controlling the passage of the reverse command signal. Also provided are signal input means for applying a selected command signal to the corresponding gate and signal output means for controlling the operation of the solid-state alternating current circuit to cause the motor to rotate in the selected direction according to the command signal passed by the gate corresponding to the selected command signal. The improvement of the present invention comprises circuit means cross-connected to the logic gates, which act to cause energization of the motor in the reverse direction to that selected for a critical period of time directly prior to stoppage, whereby electrical braking thereof is accomplished without damage to the equipment, and without the need for any electromechanical braking of the motor.

BRIEF DESCRIPTION OF THE DRAWING

The above brief description as well as further objects, features and advantages of the present invention will be more fully appreciated by referring to the following description of a presently preferred, but nonetheless illustrative embodiment in accordance with the present invention, when taken in connection with the accompanying drawing wherein a circuit diagram is illustrated.

DESCRIPTION OF THE PREFERRED EMBODIMENT

As disclosed in application Ser. No. 775,782, relays RL1 and RL2 are controlled by a logic circuit 10 comprising a "forward" section 16 and a "reverse" section 18, linked by conductors 20 and 22. Each section is connected across a voltage supply terminal 24. The logic circuit 10 receives an input command signal for either forward or reverse rotation of the motor M, at terminal 28 or terminal 26, respectively, and decides whether it is safe to pass the command on to the relays RL1 and RL2 which, in turn, control static power switches 12.

Each section 16, 18 contains five transistors of the NPN-silicon type, identified as Q1, Q2, Q3, Q4 and Q5 in section 18; and Q6, Q7, Q8, Q9 and Q10 in section 16. The resistors R1, R7, R11, R14, R16, R22, R25, R26, and R29 preferably have a resistance rating of 5.6K each. The rating of resistors R3, R6, R10, R13, R21, R24 and R28 preferably is 3.3K each. That of each resistor R2, R5, R8, R12, R15, R17, R20, R23, R27 and R30 is 1K. Finally, each of the resistors R4 and R19 is rated at 10K resistance.

The capacitors C1 and C2 are rated at 2.2 mfd. each; while the diodes D1 and D3 are of the Zener type with a rating of 4.7 volts each; and diodes D2 and D4 are rated at 60v PIV. Such elements are connected as shown in FIG. 1 to the coils 40 and 30 of relays RL1 and RL2 respectively.

In the following description of the logic circuit 10, FIG. 1, the terms logical "1" and logical "0" are used. Whenever any transistor in this circuit has one or more logical "1"'s at its input it will be turned on and its output will be a logical "0". If all its inputs are logical "0"'s it will be cut off and its output will be a logical "1".

Assume for the moment that there is not "Fwd" signal present, then transistor Q8, section 16, is not gated, causing its output to become a logical "1". This output of transistor Q8 gates transistor Q9, making its output a logical "0". The output of transistor Q9 is used to gate transistor Q10. However, with a logical "0" as the output of transistor Q9, transistor Q10 is not turned on, hence relay coil 30 of RL2 remains deenergized. With relay coil 30 of relay RL2 deenergized, contacts RL2—1 remain in the normally closed position, thereby providing a logical "1" at the gate of transistor Q7. With a logical "1" existing at the gate of transistor Q7, its output becomes a logical "0", hence, at any time there is not "Fwd" signal, a logical "0" will appear, through conductor 20, as one of the inputs into transistor Q4. Conversely, with no "Rev" signal present, the output of transistor Q2 will also be a logical "0", and will appear via conductor 22 as one of the inputs to transistor Q9.

In order to operate the starter to control the energization of motor M in either the forward or reverse direction, two logical "0" inputs must be at either transistor Q9 or transistor Q4 respectively. It is apparent, therefore, that transistor Q7 and transistor Q2 provide the necessary electrical interlocks through conductors 20 and 22, between forward and reverse operation.

As an example of such operation of the logic circuit 10 of the invention, assume it is selected to operate in the "Fwd" direction. To obtain such mode of operation, a logical "1" would have to be fed into the gate of transistor Q6 and transistor Q8 simultaneously through the "Fwd" connector. A logical "1" at the gate of transistor Q6 turns it on, causing a logical "0" at the gate of transistor Q4, causing it to turn on, thus producing a logical "0" at transistor Q5, causing it to turn off. From FIG. 1, it is apparent that relay coil 40 of relay RL1 cannot be energized as long as transistor Q5 is turned off, thereby providing the necessary electrical interlocking described above.

With the existence of the "Fwd" signal, the logical "1" appearing at the gate of transistor Q8 causes it to turn on, providing a logical "0" at its output, and hence, the second logical "0" required at the input of transistor Q9 in order to turn it off (recalling from the description of the operation given above that the other logical "0" appearing at the input to transistor Q9 came from transistor Q2 in the "Rev" section 18 of the logic circuit 10). With transistor Q9 turned off, a logical "1" would appear at the gate of transistor Q10, turning it on, hence energizing coil 30 of the relay RL2, thereby providing the closure of contacts RL2-2, RL2-3, and RL2-4 to obtain "Fwd" operation. "Rev" operation is similar, and provides similar closure of contacts RL1-2, RL1-3, and RL1-4. The time delay network in the gates of both transistor Q7 and transistor Q2 prevents one set of static power switches 12 from being energized before the other set is completely turned off.

As described above, to be able to energize relay RL1 for reverse operation the input to transistor Q4 from transistor Q7 must be a logical "0". But as long as relay RL2 is energized, contact RL2-1 is open and transistor Q6 is turned on. This makes the input to transistor Q7 a logical "0" and therefore, its output will be a logical "1", making it impossible for coil 40 of relay RL1 to be energized. But even when relay RL2 is deenergized the input to transistor Q7 remains a logical "0" until the capacitor C2 charges up through resistor R19 to the logical "1" level. This delay is preselected to provide the time necessary for the static power switches 12 for the forward direction to turn off before those for the reverse direction can be turned on. The capacitor C1 and the resistor R4 perform a similar function for the reverse direction.

According to the present invention, additional circuit components to accomplish electrical braking of the motor M, comprises cross-connected circuits 30 and 32 containing capacitors C3 and C4, respectively, circuit 30 is connected between the collector terminal of transistor Q1 in section 18, and the base terminal of transistor Q8, in section 16. Similarly, circuit 32 is connected between the collector terminal of transistor Q6 in section 16, and the base terminal of transistor Q3 in section 18. The capacitors C3 and C4 are proportioned in value with that resistors R31 and R32; and with diodes D5 and D6 as follows:

| Component | Value (Rating) |
|---|---|
| R 31 | 5.6K |
| R 32 | 5.6K |
| C 3 | 22 mfd. |
| C 4 | 22mfd. |
| D 5 | 60PIV ) Silicon Diodes |
| D 6 | 60PIV ) Silicon Diodes |

Such values result in an AC power reversal time of approximately 50 milliseconds each time the motor is stopped.

In operation, assuming that there is a "reverse" signal present (terminals 24 & 28 are connected together). Q1 will be "on" and no charge present on C3. Now assume the "reverse" signal is removed. Q1 will now turn "off" and C3 will charge through resistors R31 and the base emitter of Q8, causing Q8 to turn "on" for a time period of approximately 100 milliseconds. When Q8 turns "on" and a short time later when Q2 turns "on", Q9 will turn "off", thus turning Q10 "on" energizing RL2. RL2 will remain energized for a time period which is the difference between the 100 millisecond time period and the short delay caused by C1 and R4. For the time RL2 is energized, the motor will be energized in the forward direction, thus causing it to stop rapidly.

When the motor is running in the forward direction and the forward input signal is removed, the motor is braked by a similar circuit comprised of R32 and C4.

The time period for reversal may be adjusted by changing the values of R31 and C3 for one direction and the values of R32 and C4 for the other direction.

Diodes D5 and D6 operate to block unwanted charging of C1 and C2 when Q1 and Q6 turn off.

Thus, motor M is braked electrically by automatically reversing two of the motor input power phases for a short but precise period each time the motor is required to stop, without damage to the system, and without the need for any electromechanical brake.

What is claimed is:

1. In a reversing starter for an AC motor adapted to be energized by a three-phase current supply system comprising in combination:
    a solid-state AC switching circuit operative in response to a directional command signal to control two of the phases of such system to cause rotation of the motor in the selected direction; and
    a protective solid-state logic circuit for controlling said switching circuit, comprising
    at least two logic gates, one for controlling the passage of a forward command signal, and the other for controlling the passage of the reverse command signal;
    signal input means for applying a selected command signal to the corresponding gate; and
    signal output means for controlling the operation of said solid-state AC circuit to cause said motor to rotate in the selected direction according to the command signal passed by the gate corresponding to the selected command signal;
    the improvement which comprises circuit means cross-connected to said logic gates, which act to cause energization of the motor in the reverse direction to that selected for a critical period of time directly prior to stoppage, whereby electrical braking thereof is accomplished without damage to the equipment, and without the need for any electromechanical braking of the motor.

2. The invention as defined by claim 1, in which
    said switching circuit includes static power switches for blocking high voltage from the AC motor during phase switching thereof, and each of said gates is a NOR-type circuit with an NPN-transistor connected across a DC power supply, provided with RC signal delay circuit components.

* * * * *